March 11, 1958 — M. R. PEXTON — 2,826,138
JUICE EXTRACTORS
Filed July 7, 1955
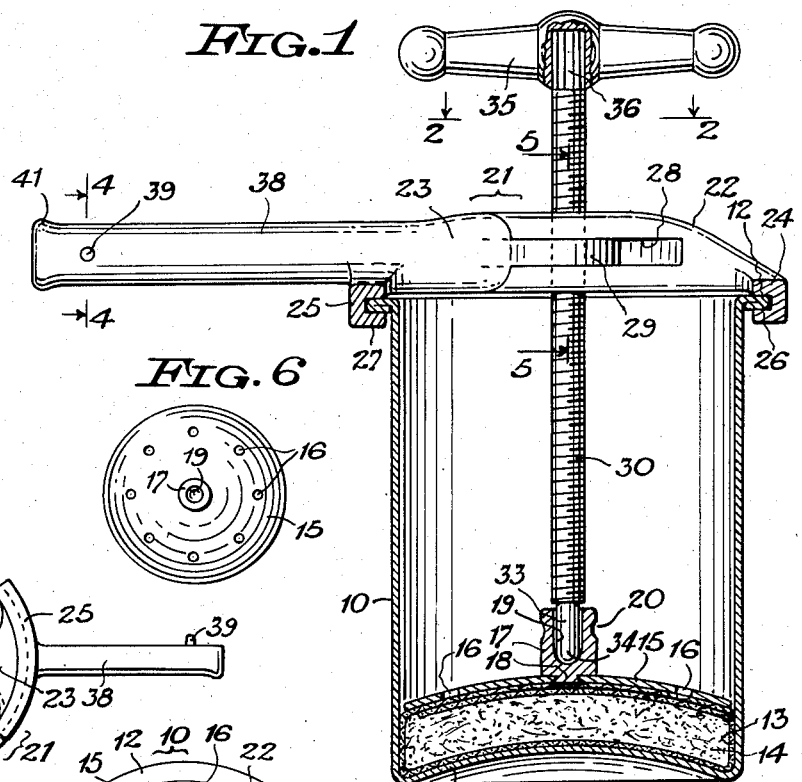
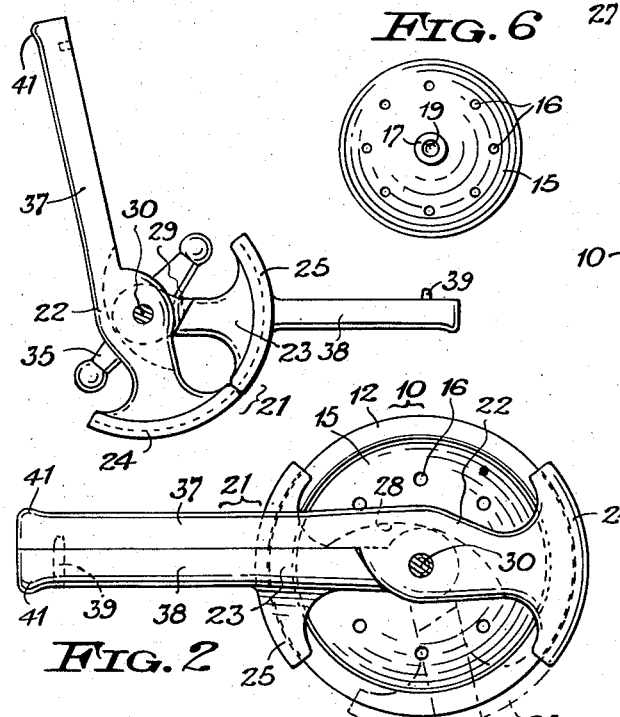
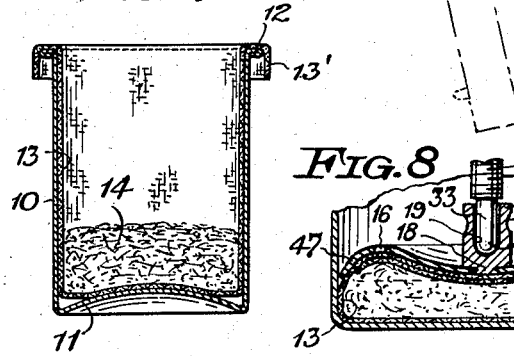
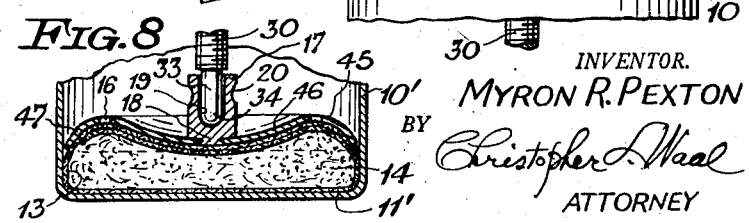
INVENTOR.
MYRON R. PEXTON
BY
Christopher L. Waal
ATTORNEY

United States Patent Office 2,826,138
Patented Mar. 11, 1958

2,826,138

JUICE EXTRACTORS

Myron R. Pexton, Los Angeles, Calif., assignor to Lee Foundation for Nutritional Research, Milwaukee, Wis., a corporation of Wisconsin Application July 7, 1955, Serial No. 520,499

6 Claims. (Cl. 100—289)

The present invention relates to presses and more particularly to juice extractors.

An object of the invention is to provide an improved juice extractor adapted for domestic and laboratory use in expressing juice from materials such as fruits and vegetables, and of such character as to permit convenient manipulation and efficient extraction.

Another object is to provide a juice extractor including a plunger-guiding frame or support which can easily and quickly be secured to and detached from a container receiving the material to be expressed.

Still another object is to provide a juice extractor of this character in which the plunger-guiding frame also forms a lifting and pouring holder for the container.

A further object is to provide a juice extractor which is of simple, durable and rugged construction and is capable of inexpensive manufacture.

The invention further consists in the several features hereinafter described and claimed.

In the accompanying drawing, illustrating certain embodiments of the invention,

Fig. 1 is an elevational view of a juice extractor constructed in accordance with the invention, parts being broken away and parts being shown in section;

Fig. 2 is a top view of the extractor, a plunger screw stem thereof being shown in transverse section on the line 2—2 of Fig. 1, and a releasing position of a frame member of the device being shown in broken lines;

Fig. 3 is a bottom view of the extractor frame when detached from the container, parts of the plunger screw stem being shown in transverse section;

Fig. 4 is a fragmentary detail sectional view taken generally on the line 4—4 of Fig. 1;

Fig. 5 is a fragmentary detail sectional view taken generally on the line 5—5 of Fig. 1;

Fig. 6 is a detail top view of a plunger follower disk;

Fig. 7 is a vertical sectional view of a container and associated material-receiving filter bag as they appear during the filling operation, and Fig. 8 is a vertical sectional view similar to the lower portion of Fig. 1, but showing a modified form of construction.

In the drawing, 10 designates a cylindrical metallic container or vessel, such as of stainless steel, having a bottom wall 11 and a flat, out-turned, reversely folded, circular rim flange or bead 12 at the open top of the container. The bottom wall 11 is preferably of upwardly convex, spherically curved shape, as seen in Figs. 1 and 7.

The container is adapted to receive therein a porous cloth filter bag 13 which holds comminuted material 14, such as shredded fruit or vegetable material, from which juice is to be expressed. The bag 13 is initially placed in the container in open condition shown in Fig. 7, the upper edge portion 13' of the bag being reversely folded over the flanged upper edge of the container to support the open-topped bag while the comminuted material 14 is deposited in the bag. The bag is then closed over the mass of material.

A plunger follower 15, preferably in the form of an upwardly convex disk of stainless steel, rests on the closed material-holding bag, as seen in Fig. 1, and is adapted to be pressed downwardly on the bag, as hereinafter described, for expressing juice from the material. The convex follower disk, which fits loosely in the container, has approximately the same spherical curvature as the container bottom wall, and is provided with a concentric circular series of juice-liberating openings or perforations 16. At its upper side the follower disk is provided with a central, upwardly opening, tubular knob 17 which is rigidly secured at its lower end to the follower disk, as by a riveted joint 18. The knob has a coaxial cylindrical socket 19 and is formed with a surrounding annular groove 20 to provide a fingerhold.

An articulated frame or support 21 extends diametrically over the peripherally flanged or beaded upper end of the container and comprises a pair of complementary hingedly connected frame members 22 and 23, such as of a cast aluminum alloy, the hinge axis being vertical and coaxial with the container. The rigid frame members have respective arcuate portions 24 and 25 concentric with the container and provided with respective inwardly facing arcuate grooves or channels 26 and 27 of rectangular cross-section adapted to receive the rim flange of the container, the radius of the bottom of each channel being slightly greater than the radius of the rim flange. Each of the arcuate frame portions 24 and 25 extends over slightly less than 90° of arc, and when the articulated frame is in its normal mounted position on the container, as seen in Figs. 1 and 2, these arcuate frame portions are disposed at diametrically opposite portions of the container rim flange 12 and present an extended bearing surface engageable with the rim flange. The frame member 22 has milled therein a laterally opening, parallel-faced, horizontal slot or pocket 28, and the frame member 23 is provided with a parallel-faced, horizontal ear 29 which slidably fits in the slot 28. A plunger screw stem or rod 30, such as of stainless steel, is threaded in aligned vertical openings 31 formed in the frame member 22 above and below the pocket 28, and passes through a vertical pivot opening or bore 32 formed in the ear 29, thus pivotally connecting the frame members. The plunger screw stem 30 has a reduced cylindrical lower end 33 which loosely fits in the socket 19 of the follower knob 17 and has a spherically rounded lower end 34 engaging the bottom of the socket. The upper end of the screw stem is tightly secured in the central hub of a ball-ended cross bar 35, as by pressing a knurled portion 36 of the stem into the cross bar.

The frame members 22 and 23 are provided with respective radially extending, complementary handle portions 37 and 38, the handle portion 37 and arcuate frame portion 24 being disposed at opposite sides of the screw stem, and the handle portion 38 and arcuate frame portion 25 being disposed at the same side of the screw stem. When the frame is mounted on the container, as seen in Fig. 2, the complementary handle portions 37 and 38 are disposed in lateral abutment and together form a hand-grip. Preferably, the abutting handle portions are kept in alignment by a dowel 39 secured in the handle portion 38 and detachably fitting in a bore or socket 40 formed in the handle portion 37. The handle portions have enlarged outer ends 41 to insure a firm handhold. At each of the opposite sides of the attached diametrically extending frame, the rimmed upper end of the container is open for a considerable distance between the ends of the arcuate frame portions 24 and 25, so as to permit pouring of juice from the container without contacting the frame.

When the extractor is to be used, the filter bag 13 is placed in the container and the material 14 to be expressed is deposited in the bag, as hereinbefore described, whereupon the bag is closed over the material and the follower disk 15 is placed in the container over the bag. The hinged frame members are then swung to the position seen in Fig. 3, in which the abutting arcuate portions 24 and 25 extend over less than 180° of arc. With the articulated frame in upright position, the lower end of the screw stem 30 is entered into the container, and the then adjacent or abutting channeled arcuate frame portions 24 and 25 are engaged over the container rim flange 12 at one side of the container. The hingedly connected frame members are thereupon swung relatively about the plunger frame-stem to their normal frame-forming positions, shown in Figs. 1 and 2, disposing the channeled arcuate frame portions at diametrically opposite sides of the container rim flange in embracing relation thereto and bringing the handle portions 37 and 38 into lateral abutment, thus interlocking the frame and the container. While the handle 37, 38, is gripped by one hand of the user to hold the frame and the container, the screw stem 30 is screwed downwardly by the other hand engaging the cross bar 35, entering the lower end of the stem into the socket-forming knob member 17 of the follower disk 15. Further downward displacement of the screw stem exerts axial pressure on the follower disk, causing juice to be expressed from the material through the filter bag, the openings 16 in the follower disk facilitating escape of the juice. The container 10 is then lifted and tilted by the handle 37, 38, to pour the liberated juice into another container, not shown. Application of further pressure on the follower disk by the screw stem will usually liberate additional juice, which is then poured off in the same manner. The reaction pressure on the frame 21 is resisted by the engagement of the channeled arcuate frame portions 24 and 25 with the bottom face of the container flange 12, these channeled frame portions presenting an extended bearing surface.

After completion of the juice-extracting operation, the pressure on the follower disk is released by screwing the plunger stem 30 upwardly. The hinged frame members are then swung by their handle portions 37, 38, to their release positions in which the arcuate portions 24 and 25 of the frame members are in abutment at one side of the container. The stem-carrying frame is then shifted laterally from the container rim flange and is lifted from the container. The follower is then removed by its knob 17, and the bag is lifted from the container. The spent pulp is removed from the bag, and the bag may then be washed in preparation for subsequent use.

The modified form of juice extractor shown in Fig. 8 includes a cylindrical container 10' which is similar to the container 10 of Fig. 1 except that it has a flat bottom wall 11'. The extractor of Fig. 8 further includes a stainless steel follower disk or pressure plate 45 of sinuous cross section to provide stiffness, the disk having a concave central portion 46 and a downwardly inclined marginal portion 47, and further having a circular series of juice-liberating perforations 16. As in the device of Fig. 1, the disk 45 has a central, upwardly projecting socket-forming knob 17 which receives the reduced lower end of the plunger screw stem 30. The device of Fig. 8 is otherwise similar to that of Fig. 1, and is used in the same manner.

I claim:

1. In a juice extractor, a cylindrical material-receiving container having a bottom wall and an exterior circular rim flange, a frame including a pair of complementary rigid frame members hingedly connected about an axis coaxial with said container and having respective arcuate channeled portions detachably embracing said rim flange at opposite sides of the container, said hingedly connected frame members having respective handle portions projecting laterally outward beyond said rim flange and normally disposed in adjacent relation to each other to form a hand-grip, said frame members when swung relatively to each other in one direction disposing said channeled portions at one side of the container to permit entry and release of said rim flange with respect to said channeled portions, a rotatable plunger screw stem threaded in said frame, coaxially with said axis and a plunger follower engaging the lower end of said screw stem.

2. A plunger-guiding frame for an extraction press of the type having a cylindrical container and a rotatable plunger screw stem movable coaxially in the container, comprising a pair of rigid frame members having a hinge connection coaxial with the screw stem and further having respective channeled portions adapted to embrace an exterior rim flange of the container for holding said frame on said container and for resisting reaction pressure, said frame members being relatively swingable about said hinge connection for applying and releasing said frame members with respect to said container flange, and said frame members having respective laterally projecting handle portions normally disposed in adjacent relation to each other to form a hand-grip.

3. A plunger-guiding frame for an extraction press of the type having a cylindrical container and a rotatable plunger screw stem movable coaxially in the container, comprising a pair of rigid frame members having a hinge connection and having respective channeled portions adapted to embrace a rim flange of the container for holding said frame on said container and for resisting reaction pressure, said frame members being relatively swingable about said hinge connection for applying and releasing said frame members with respect to said container flange, said hinge connection having a screw-threaded portion coaxial therewith and engaged by said screw stem.

4. A plunger-guiding frame for an extraction press of the type having a cylindrical container and a rotatable plunger screw stem movable coaxially in the container, comprising a pair of frame members having a hinge including said screw stem as a pivot and having respective channeled portions adapted to embrace an exterior rim flange of the container for holding said frame on said container and for resisting reaction pressure, said frame members being relatively swingable about said hinge connection for applying and releasing said frame members with respect to said container flange, said hinge connection having a screw-threaded portion engaged by said screw stem, one of said frame members having a lateral recess at said hinge connection with parallel faces perpendicular to the axis of the hinge connection, and the other frame member having a parallel-sided apertured ear fitting in said recess.

5. A juice extractor comprising a container having a rim flange, a frame including a pair of hingedly connected rigid frame members having respective channeled portions adapted to embrace said rim flange at opposite sides of said container, said frame members further having respective handle portions disposed in laterally adjacent relation when the frame is in normal flange-engaging position, and said adjacent handle portions forming a handgrip for lifting the container and pouring the contents thereof, said frame further having a screw-threaded portion at the pivotal axis of said frame members, and a plunger screw stem extending axially in said container and engaging said screw-threaded portion.

6. In combination, with a container having an exterior circular rim flange and adapted to receive juice-bearing material to be pressed, a frame including a pair of hinged rigid frame members having respective channeled portions releasably embracing said rim flange, and material-pressing plunger means axially in said container and including a rotatable screw stem having a coaxial threaded engagement with said frame at the hinged connection of said frame members.

References Cited in the file of this patent

UNITED STATES PATENTS

| | | |
|---|---|---|
| 700,668 | Pate | May 20, 1902 |
| 928,562 | Teml | July 20, 1909 |
| 977,430 | Blake | Dec. 6, 1910 |
| 1,128,733 | Steinbach | Feb. 16, 1915 |
| 1,294,211 | Webley | Feb. 11, 1919 |
| 1,618,879 | James | Feb. 22, 1927 |
| 1,763,965 | High | June 17, 1930 |
| 2,322,810 | Allen et al. | June 29, 1943 |
| 2,536,246 | Wendt | Jan. 2, 1951 |

FOREIGN PATENTS

| | | |
|---|---|---|
| 16,827 | Germany | Nov. 23, 1880 |
| 436,123 | France | Jan. 15, 1912 |
| 492,380 | Great Britain | Sept. 20, 1938 |

U. S. DEPARTMENT OF COMMERCE
PATENT OFFICE
CERTIFICATE OF CORRECTION

Patent No. 2,826,138                         March 11, 1958

Myron R. Pexton

It is hereby certified that error appears in the printed specification of the above numbered patent requiring correction and that the said Letters Patent should read as corrected below.

Column 4, line 22, after "frame" strike out the comma and insert the same after "axis", same line; line 54, after "hinge" insert --connection--; line 69, for "having a" read --having an exterior circular--; column 5, line 9, for "hinged" read --hingedly connected--; line 12, after "means" insert --movable--.

Signed and sealed this 22nd day of April 1958.

(SEAL)
Attest:

KARL H. AXLINE                                   ROBERT C. WATSON
Attesting Officer                               Commissioner of Patents